C. W. ROYSE.
Machines for Cutting Box Stuff.

No. 138,584. Patented May 6, 1873.

Witnesses:

Inventor:
C. W. Royse
Attorneys.

UNITED STATES PATENT OFFICE

CHARLES W. ROYSE, OF RINDGE, NEW HAMPSHIRE.

IMPROVEMENT IN MACHINES FOR CUTTING BOX STUFF.

Specification forming part of Letters Patent No. 138,584, dated May 6, 1873; application filed December 14, 1872.

To all whom it may concern:

Be it known that I, CHARLES W. ROYSE, of Rindge, in the county of Cheshire and State of New Hampshire, have invented a new and Improved Machine for Cutting Rim Stuff for Boxes, of which the following is a specification:

The invention consists in the improvement of rim-stuff cutters, as hereinafter described and pointed out in the claim.

Figure 1:
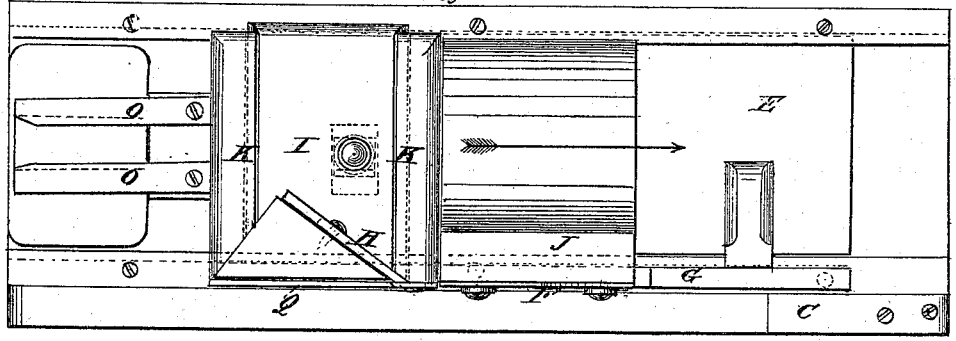
Figure 2:
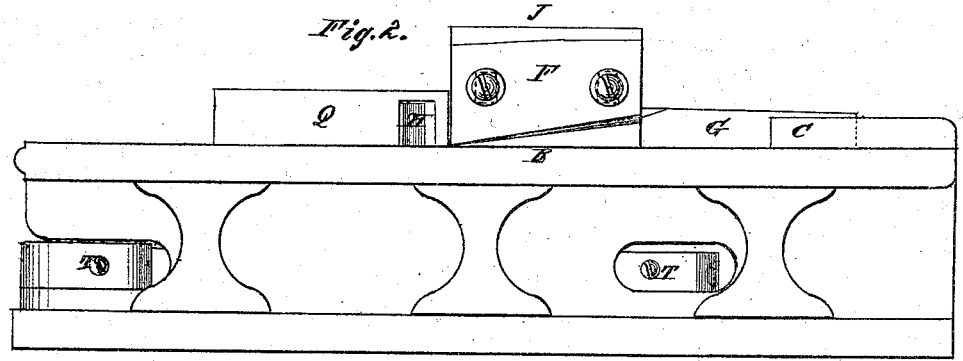
Figure 3:
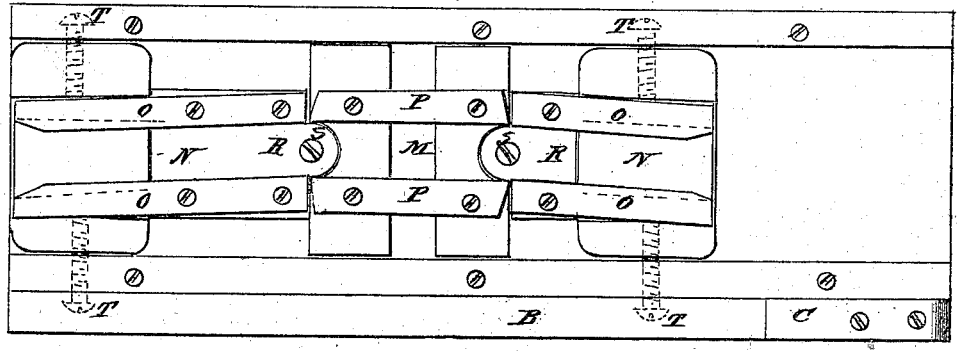
Figure 4:
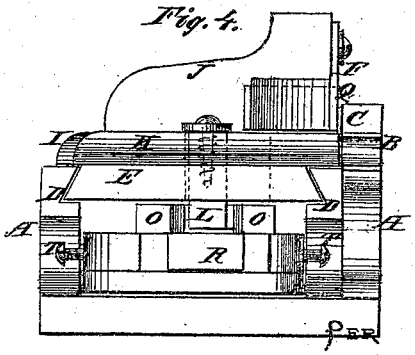

Figure 1 is a plan view of my improved machine for cutting rim stuff. Fig. 2 is a front elevation. Fig. 3 is a plan view of the frame and the guide for the planing-tool, the tool-carrying slide being removed; and Fig. 4 is an end elevation of the machine.

Similar letters of reference indicate corresponding parts.

A represents a long rectangular frame having a rest, B, at the top of one side for the block to be cut to rest on, a stop, C, at one end to hold the block from being moved by the tool, and grooves or ways D for the sliding table or tool-carrier E to work forward and back along the block to be cut. This table carries a strong block, J, with a vertical wall above and a little one side of the work support, on which is a cutter, F, which splits or shaves off a thin strip from the block each time it is pushed forward, the block being first pushed up against the side of bar G attached to the block J and projecting from it along the rest B in the plane of the face of the block to gage the thickness of the strip cut off. This is the common arrangement used for cutting rim stuff, which, being when so cut of uniform thickness throughout, has to be dressed off, tapering at each end for round boxes and at one end for those of oval form. Now, I propose to taper the strips at the same time they are cut off, and for this purpose I arrange a surface-planing tool, H, behind the blocks J on a stock or holder, I, fixed in ways K on the table, so as to slide forward and back at right angles to the lengthwise direction of the strip with a projection, L, extending down into a guiding-channel, M N N, formed by suitable rails O P, which said guiding-channel is shaped so as to carry the tool H in the proper direction, and cause it to taper the strip at each end, as desired. The strip being cut is held away from the plane by the strong plate Q fastened to the table E and rising up edgewise behind the tool, so as to pass between the strip cut off and the block. The bottom pieces R which connect rails O O are jointed at S and provided with set-screws T, which enable either end of railway to be placed in line with straight rails P P, when but one end of strip requires tapering.

Having thus described my invention, I claim as new and desire to secure by Letters Patent—

1. The combination, with an ordinary block-holder, B C, of the reciprocating shave-cutter F and the taperer H arranged on same slide, and operated as and for the purpose described.

2. The combination, with a carriage, K, and tool-holder I, provided with lug L, of the guide-channel M N N, constructed and arranged as described, to regulate the movement of the tapering cutter, as set forth.

3. The combination, with the cutter H, of the plate Q, constructed and arranged substantially as and for the purpose set forth.

CHARLES W. ROYSE.

Witnesses:
 HENRY A. RUSSELL,
 MILLARD F. JONES.